United States Patent
Pare, Jr. et al.

(10) Patent No.: US 6,581,042 B2
(45) Date of Patent: *Jun. 17, 2003

(54) TOKENLESS BIOMETRIC ELECTRONIC CHECK TRANSACTIONS

(75) Inventors: David Ferrin Pare, Jr., Berkeley, CA (US); Ned Hoffman, Berkeley, CA (US); Jonathan Alexander Lee, Berkeley, CA (US)

(73) Assignee: Indivos Corporation, San Francisco, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 09/848,867

(22) Filed: May 3, 2001

(65) Prior Publication Data

US 2001/0029493 A1 Oct. 11, 2001

Related U.S. Application Data

(63) Continuation of application No. 09/239,595, filed on Jan. 29, 1999, now Pat. No. 6,230,148, which is a continuation of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.[7] ............................................... G06F 17/60
(52) U.S. Cl. .............................. 705/40; 705/26; 705/35; 705/39; 705/40; 705/44; 705/53; 705/75; 705/78; 380/23; 380/24; 380/25; 380/49; 380/229; 380/232
(58) Field of Search ............................. 705/39, 40, 26, 705/35, 44, 53, 75, 78; 380/24, 25, 23, 49, 229, 232

(56) References Cited

U.S. PATENT DOCUMENTS

| | | | |
|---|---|---|---|
| 3,943,335 A | 3/1976 | Kinker et al. | 235/61.7 |
| 4,321,672 A | 3/1982 | Braun et al. | 364/408 |
| 4,390,968 A | 6/1983 | Hennessy et al. | 364/900 |

(List continued on next page.)

FOREIGN PATENT DOCUMENTS

| | | |
|---|---|---|
| EP | 0581421 A1 | 2/1994 |
| EP | 0598469 A2 | 5/1994 |
| EP | 0651357 A1 | 3/1995 |

(List continued on next page.)

OTHER PUBLICATIONS

Anderson et al., *Security Management*, American Society for Industrial Security V.37,n11, 17–19 (Nov. 1993).

(List continued on next page.)

*Primary Examiner*—Eric W. Stamber
*Assistant Examiner*—Raquel Alvarez
(74) *Attorney, Agent, or Firm*—Marger Johnson & McCollom, P.C.

(57) ABSTRACT

A tokenless authorization of an electronic check between a payor and a payee using an electronic identicator and at least one payor bid biometric sample is described. The method comprises a payor registration step, wherein the payor registers with an electronic third party identicator at least one registration biometric sample, and at least one payor checking account data. An electronic financial transaction is formed between the payor and the payee, comprising at least one payor bid biometric sample, wherein the bid biometric sample is obtained from the payor's person, in a transaction formation step. Preferably in one transmission step the payor bid biometric sample is electronically forwarded to the electronic identicator. A comparator engine or the identification module of the electronic identicator compares the bid biometric sample with at least one registered biometric sample for producing either a successful or failed identification of the payor. Once the electronic identicator successfully identifies the payor, the payor's previously registered checking account data is retrieved, and a biometric-based authorization of an electronic check is authorized without the payor presenting any personalized man-made tokens such as paper checks or magnetic swipe cards.

37 Claims, 5 Drawing Sheets

U.S. PATENT DOCUMENTS

| | | | |
|---|---|---|---|
| 4,675,815 A | 6/1987 | Kuroki | 364/900 |
| 4,799,156 A | 1/1989 | Shavit et al. | 364/401 |
| 4,821,118 A | 4/1989 | Lafreniere | 358/108 |
| 4,837,422 A | 6/1989 | Dethloff et al. | 364/408 |
| 4,926,480 A | 5/1990 | Chaum | 380/23 |
| 4,961,142 A | 10/1990 | Elliott et al. | 364/408 |
| 4,993,068 A | 2/1991 | Piosenka et al. | 380/23 |
| 4,995,086 A | 2/1991 | Lilley et al. | 382/4 |
| 4,998,279 A | 3/1991 | Weiss | 340/825 |
| 5,025,372 A | 6/1991 | Burton et al. | 364/406 |
| 5,036,461 A | 7/1991 | Elliot et al. | 364/408 |
| 5,054,089 A | 10/1991 | Uchida et al. | 382/4 |
| 5,095,194 A | 3/1992 | Barbanell | 235/380 |
| 5,109,427 A | 4/1992 | Yang | 382/4 |
| 5,109,428 A | 4/1992 | Igaki et al. | 382/5 |
| 5,144,680 A | 9/1992 | Kobayashi et al. | 250/556 |
| 5,146,102 A | 9/1992 | Higuchi et al. | |
| 5,161,204 A | 11/1992 | Hutcheson et al. | 382/190 |
| 5,168,520 A | 12/1992 | Weiss | 380/23 |
| 5,180,901 A | 1/1993 | Hiramatsu | 235/380 |
| 5,191,611 A | 3/1993 | Lang | 380/25 |
| 5,210,588 A | 5/1993 | Lee | 356/71 |
| 5,210,797 A | 5/1993 | Usui et al. | 382/4 |
| 5,222,152 A | 6/1993 | Fishbine et al. | 382/2 |
| 5,224,164 A | 6/1993 | Eisner et al. | 380/44 |
| 5,229,764 A | 7/1993 | Matchett et al. | 340/825.34 |
| 5,230,025 A | 7/1993 | Fishnine et al. | 382/4 |
| 5,239,583 A | 8/1993 | Parrillo | 380/23 |
| 5,241,606 A | 8/1993 | Horie | 382/4 |
| 5,251,259 A | 10/1993 | Mosley | 380/23 |
| 5,265,162 A | 11/1993 | Bush et al. | 380/24 |
| 5,274,695 A | 12/1993 | Green | 379/88 |
| 5,276,314 A | 1/1994 | Martino et al. | 235/380 |
| 5,280,527 A | 1/1994 | Gullman et al. | 380/23 |
| 5,321,242 A | 6/1994 | Heath, Jr. | 235/382 |
| 5,325,442 A | 6/1994 | Knapp | 382/4 |
| 5,335,288 A | 8/1994 | Faulkner | 381/2 |
| 5,343,529 A | 8/1994 | Goldfine et al. | 380/23 |
| 5,351,303 A | 9/1994 | Willmore | 382/4 |
| 5,354,974 A | 10/1994 | Eisenberg | 235/379 |
| 5,359,669 A | 10/1994 | Shanley et al. | 382/117 |
| 5,383,113 A | 1/1995 | Kight et al. | 705/40 |
| 5,386,104 A | 1/1995 | Sime | 235/379 |
| 5,412,738 A | 5/1995 | Brunelli et al. | 382/115 |
| 5,465,303 A | 11/1995 | Levison et al. | 382/124 |
| 5,484,988 A | 1/1996 | Hills et al. | 235/379 |
| 5,485,510 A | 1/1996 | Colbert | 379/145 |
| 5,499,288 A | 3/1996 | Hunt et al. | 379/266 |
| 5,546,471 A | 8/1996 | Merjanian | 382/124 |
| 5,546,523 A | 8/1996 | Gatto | 395/156 |
| 5,561,718 A | 10/1996 | Trew et al. | 379/266 |
| 5,604,802 A | 2/1997 | Holloway | 380/24 |
| 5,613,012 A | 3/1997 | Hoffman et al. | 382/115 |
| 5,615,277 A | 3/1997 | Hoffman | 382/115 |
| 5,636,282 A | 6/1997 | Holmquist et al. | 380/25 |
| 5,719,950 A | 2/1998 | Osten et al. | 382/115 |
| 5,745,555 A | 4/1998 | Mark | 379/95 |
| 5,764,789 A | 6/1998 | Pare, Jr. et al. | 382/115 |
| 5,802,199 A | 9/1998 | Pare, Jr. et al. | 382/115 |
| 5,805,719 A | 9/1998 | Pare, Jr. et al. | 382/115 |
| 5,826,245 A | 10/1998 | Sandberg-Diment | 705/44 |
| 5,838,812 A | 11/1998 | Pare, Jr. et al. | 705/44 |
| 5,870,723 A | 2/1999 | Pare, Jr. et al. | 705/39 |
| 5,892,824 A | 4/1999 | Beatson et al. | 380/25 |
| 5,956,700 A | 9/1999 | Landry | 705/40 |
| 6,028,950 A | 2/2000 | Merjanian | 382/126 |
| 6,045,039 A | 4/2000 | Stinson et al. | 235/379 |

FOREIGN PATENT DOCUMENTS

| | | | |
|---|---|---|---|
| EP | 0 652540 | 9/2000 | G07F/7/12 |
| WO | WO/95/13591 | 5/1995 | |
| WO | WO/98/25227 | 6/1998 | |

OTHER PUBLICATIONS

Radcliff, *When Data Warehouse become Open House*, Software Management, v16 n11, Nov. 26, 1996.

Anonymous, *A Credit Union Points a Finger at Biometrics*, Bank Network News, v 15 n16, Jan. 13, 1997.

Hall, J., *Scanning Lets Fingerprints Do Talking*, Toronto Star, PA6, May 15, 1997.

Scally, R., *CompUSA Test Fingerprints to Help Secure Transactions*, Discount Store News v36 n10, May 19, 1997.

Holmes et al., *A Performance Evaluation of Biometric Identification Devices*, Sandia National Laboratories, Albuquerque, NM, Jun., 1991.

TOKENLESS BIOMETRIC ELECTRONIC CHECK TRANSACTIONS

RELATED APPLICATION DATA

This application is a continuation of U.S. application Ser. No. 09/239,595, filed on Jan. 29, 1999, now U.S. Pat. No. 6,230,148, to issue May 8, 2001, which is a continuation of U.S. application Ser. No. 08/705,399, filed on Aug. 29, 1996, now U.S. Pat. No. 5,870,723, which is a continuation-in-part of U.S. application Ser. No. 08/442,895 filed on May 17, 1995, now U.S. Pat. No. 5,613,012 which is a continuation-in-part of U.S. application Ser. No. 08/345,523, filed on Nov. 28, 1994, now U.S. Pat. No. 5,615,277.

FIELD OF THE INVENTION

This invention relates to the field of tokenless biometric financial transactions. Specifically, this invention is directed towards a system and method of using biometrics for processing electronic check financial transactions without requiring the payor to directly use or possess any man-made personalized tokens or paper checks. For any transaction designated to be processed as an electronic check, this invention provides a payor, whether an individual or a business, with the ability to pay for goods and services either at the retail point of sale or over the internet using only a biometric sample.

BACKGROUND OF THE INVENTION

Traditionally, a person must directly possess a man-made personalized token whenever attempting authorization for an electronic financial transaction. Tokens such as magnetic ink encoded paper checks, smart cards, magnetic swipe cards, identification cards or even a personal computer programmed with resident user-specific account data, are "personalized" because they are each programmed or encoded with data that is unique and personalized to the authorized user. For examples: at a retail point of sale, the user directly possesses and physically presents personalized checks or cards encoded with his unique account data to the merchant; or, over the internet, the user directly possesses and electronically presents his personal computer's resident user-unique account data to the remote merchant. By contrast, as the disclosed invention is completely tokenless, it does not require the user to directly possess, carry or remember any personalized token that can be lost, stolen or damaged.

Of all such personalized man-made tokens, magnetic ink encoded paper checks have long been used as the token of choice in financial transactions. Currently, around 65 billion paper checks are written annually in the United States. These paper checks are time-consuming to write, costly for both consumers and businesses to handle and process, and prone to fraud. It is currently estimated that these inefficiencies annually cost consumers and businesses over $10 billion in fraud losses and over $40 billion in processing time and personnel resource costs. For example, paper checks are particularly vulnerable to fraud. Because they do not require the use of a personal identification number ("PIN"), a lost or forged paper check can easily be turned into cash by a fraud perpetrator. Counterfeit checks can readily be created by acquiring an accountholder's valid account number and bank routing code, then encoding those numbers as printed magnetic numerical characters on a blank check template. Valid paper checks that are stolen can be selectively moistened with solvents to retain authorized signatures and erase designated financial amounts in order to over-write them with a higher denomination value. These resultant fraudulent checks can then be presented to payees or businesses, with the transaction being charged to the rightful checking account. Check fraud may also be committed by authorized checkholders themselves, whereby they use a check of their own to make purchases, and subsequently claim the check had been lost or stolen, and used without their knowledge.

Of all payment modes, checks take the longest amount of time to complete, authenticate and process. They require additional time to process for deposit, and cost more money for banks to clear and settle. At the retail point of sale, submission of paper checks is often accompanied by a secondary token used for identification, such as a plastic driver's license card, requiring more time and cost. All of these charges are paid by merchants or businesses, and are ultimately borne by the consumer.

Both at a retail site and over the internet, paper checks are presented for real-time remote access to financial accounts via magnetic ink character readers, with magnetic stripe or bar code readers sometimes being used to also automatically read identification cards like a driver's license. In some instances on the Internet, the user's personal checking account data is stored resident within the user's personal computer. In this manner, a PC is the personalized man-made memory token that the user is required directly possessed each time he seeks to authorize an electronic check via the Internet.

Therefore, whether buying services or products, a consumer or a business must rely on the money transfer to be enabled by the consumer directly using personalized man-made memory tokens. The sole functions of such tokens are to attempt to identify both the user and the financial account being accessed to pay for the transaction. However, these tokens can be easily exchanged, either knowingly or unknowingly, between users, thereby de-coupling them from the original intended user. Because these encoded paper checks, identification cards or personal computers storing resident user data are ubiquitous in today's consumer and business transactions as verification of the submitter's check writing authority, and the attendant inconveniences and security vulnerabilities of such tokens are widespread.

Various token-based biometric technologies have been suggested in the prior art, using smart cards, magnetic swipe cards, or paper checks in conjunction with fingerprints, hand prints, voice prints, retinal images, facial scans or handwriting samples. However, because the biometrics are generally either: a) stored in electronic and reproducible form on the token itself, whereby a significant risk of fraud still exists because the comparison and verification process is not isolated from the hardware and software directly used by the payor attempting access, or; b) used in tandem with the user directly using magnetic swipe cards, paper checks or a PC with the user's financial data stored resident therein. Examples of this approach to system security are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; U.S. Pat. No. 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore; U.S. Pat. No. 5,832,464 to Houvener et al, all of which are incorporated herein by reference.

Uniformly, the above patents disclose financial systems that require the user's presentation of personalized tokens to authorize each transaction, thereby teaching away from tokenless biometric financial transactions. To date, the consumer financial transaction industry has had a simple equation to balance: in order to reduce fraud, the cost and complexity of the personalized token directly possessed by the user must increase.

As a result, there is a need for a new electronic financial transactions system that is highly fraud-resistant, practical, convenient for the consumer, and yet cost-effective to deploy. More specifically, there is a need for an electronic check financial transaction system that relies solely on a payor's biometric for transaction authorization, and does not require the payor to directly possess any personalized man-made memory tokens such as smart cards, magnetic swipe cards, encoded paper checks or personal computers for identification.

Lastly, such a system must be affordable and flexible enough to be operatively compatible with existing networks having a variety of electronic transaction devices and system configurations.

Accordingly, it is the objective of the present invention to provide a new system and method of tokenless biometric financial transactions for electronic checks.

As such, it is an objective of the invention to provide an electronic check financial transaction system and method that eliminates the need for a payor to directly possess any personalized man-made token which is encoded or programmed with data personal to or customized for a single authorized user. Further, it is an objective of the invention to provide an electronic financial transaction system that is capable of verifying a user's identity based on one or more unique characteristics physically personal to the user, as opposed to verifying mere possession of personalized objectives and information.

Another objective of the invention is to provide an electronic financial transaction system that is practical, convenient, and easy to use, where payors no longer need to remember personal identification numbers to access their financial accounts.

Another objective of the invention is to provide increased security in a very cost-effective manner, by completely eliminating the need for the payor to directly use ever more complicated and expensive personalized tokens.

Another objective of the invention is to provide an electronic financial transaction system that is highly resistant to fraudulent access attempts by unauthorized users.

Another objective of the invention is to authenticate the system to the payor once the electronic financial transaction is complete, so the payor can detect any attempt by criminals to steal their authentication information.

Another objective of the invention is that the payee be identified by an electronic third party identicator, wherein the payee's identification is verified. Optionally, therefore, the payee would register with the electronic third party identicator payee identification data, which optionally comprises, a payee hardware ID code, a payee phone number, a payee email address, a payee digital certificate code, a payee financial account number, a payee biometric, or a payee biometric and PIN combination.

Still, another objective of the invention is to be added in a simple and cost-effective manner to existing terminals currently installed at points of sale and used over the Internet around the world.

Yet another objective of the invention is to be efficiently and effectively operative with existing financial transactions systems and protocols, specifically as these systems and protocols pertain to processing of electronic checks.

SUMMARY OF THE INVENTION

The invention satisfies these needs by providing a method and device for tokenless authorization of an electronic check between a payor and a payee using an electronic identicator and at least one payor bid biometric sample. The method comprises a payor registration step, wherein the payor registers with an electronic identicator at least one registration biometric sample, and at least one payor checking account. An electronic financial transaction is formed between the payor and the payee, comprising at least one payor bid biometric sample, wherein the bid biometric sample is obtained from the payor's person, in a transaction formation step. Preferably in one transmission step the payor bid biometric sample is electronically forwarded to the electronic identicator. A comparator engine or the identification module of the identicator compares the bid biometric sample with at least one registered biometric sample for producing either a successful or failed identification of the payor. Once the identicator successfully identifies the payor, the payor's previously registered checking account data is retrieved, and a biometric-based authorization of an electronic check is issued without the payor presenting any personalized man-made tokens such as paper checks or magnetic swipe cards to transfer funds from the payor's checking account to a payee financial account.

The transaction formation step may optionally include a transaction amount in the electronic financial transaction.

The method may also optionally include a step in which the payor's previously registered checking account data is electronically displayed to the payor, or electronically forwarded to a financial transaction processor.

The payor registration step may optionally further comprise registering a payor personal identification number with the electronic identicator.

The authorization system alternatively further comprises a payor resource determination step, wherein it is determined if the payor's financial account has sufficient resources to be debited for the transaction amount.

Optionally, in a payor account selection step, after the payor has been successfully identified in the payor identification step, the tokenless authorization system presents at least one financial account which was registered by the payor with the tokenless authorization system for selection of one of the checking accounts by the payor for debiting. In a transaction payment step, the transaction amount is debited from a payor's financial account. Preferably, at the same time, the transaction amount is credited to the payee's financial account.

The present invention as described satisfies these objectives in a number of ways. First, it is extremely easy and efficient for people to use because it eliminates the need to directly possess and safeguard any personalized tokens in order to access their authorized electronic financial accounts. Anyone who has lost a checkbook or had their personal computer damaged or stolen, knows well the keen anxiety caused by such tokens. This invention direct addresses these concerns. The payor is now uniquely empowered, to conveniently conduct personal and/or professional electronic transactions at any time without dependence upon any tokens that may be stolen, lost or damaged.

The invention is clearly advantageous from a convenience standpoint to payees and financial institutions by making electronic check purchases and other financial transactions less cumbersome and more spontaneous. The paperwork of financial transactions is significantly reduced as compared to standard paper or electronic check transactions wherein the copies of the check must often be retained by the payee, financial institutions and the payor. Further, because the method and system of this invention is designed to provide a person with simultaneous direct access to all of his financial accounts, the need for transactions involving paper checks, paper money, credit drafts and the like will be greatly reduced, thereby reducing the cost of equipment and staff required to collect, account, and process such transactions.

Further, the substantial manufacturing and distributing costs of issuing and reissuing all personalized tokens such as paper checks, magnetic swipe cards, and smart cards, thereby providing further economic savings to issuing banks, businesses, and ultimately to consumers. Even the traditional requirement for internet electronic transactions of the payor needing to directly possess and use the ultimate personalized token, a personal computer with resident payor identification data, will be eliminated.

Moreover, the invention is markedly advantageous and superior to existing systems in being highly fraud resistant by determining identity and transaction authorization solely from an analysis of a user's unique biometric characteristics.

These and other advantages of the invention will become more fully apparent when the following detailed description of the invention is read in conjunction with the accompanying drawings.

DETAILED DESCRIPTION

The invention provides a cardless biometric method for authorizing electronic financial transactions using electronic checks either at the retail point of sale or over the Internet. It is the essence of this invention that the payor not be required to directly use any man-made personalized token in order to effect the transaction. A computer system is used to accomplish these goals.

The tokenless authorization system or the third party identicator comprises the following components:

Party Identification Apparatus (PIA)
Communication lines
Data Processing Center (DPC)

These components together allow a payor to originate an electronic check without requiring the payor to carry driver's licenses, credit cards, check guarantee cards, or other forms of identity as well as the actual paper check itself.

Throughout this specification the terms electronic identicator and third party identicator are used interchangeably; it is understood that the electronic identicator may be owned and/or operated by the payee, the payor, or by a third party, without loss of generality.

Party Identification Apparatus (PIA)

Figure 1:
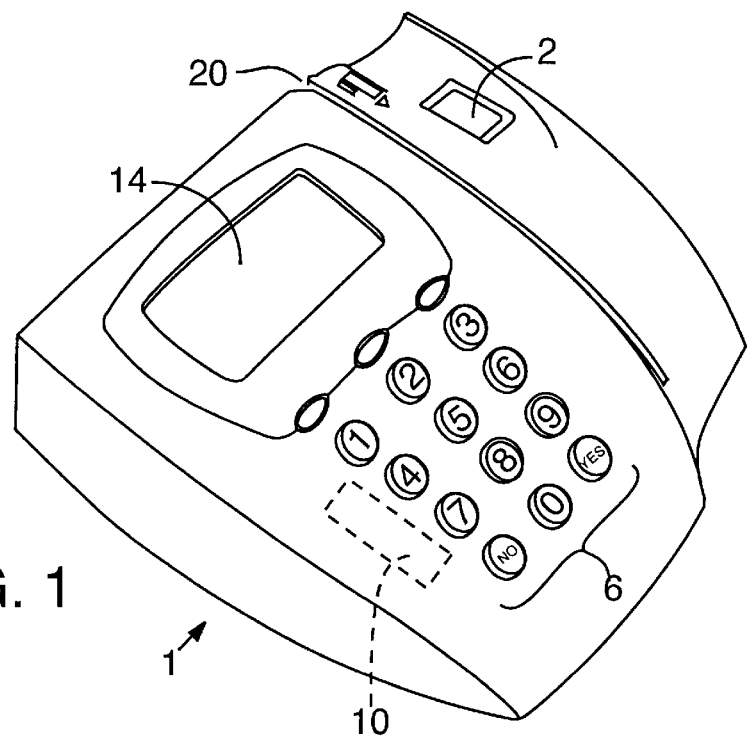
FIG. 1 shows the preferred embodiment of a Party Identification Device (PIA) with a biometric sensor and key pad.

The PIA is a device that gathers identity information for use in authorizing electronic checking transactions. Each PIA conducts one or more of the following operations:

gather biometric input from a payor or payee
gather a PIN code or password from a payor or payee
secure communication between PIA and DPC using encryption
secure storage of secret encryption keys
store and retrieve a unique payee PIA hardware identification code
secure enclosure & components from unauthorized tampering
display information, allow parties to approve or cancel a financial transaction
scan a MICR check
store, verify, and retrieve a payee digital identification code
allow parties to select among choices of payor checking and payee financial accounts A preferred embodiment containing these components is shown in FIG. 1.

Biometric input is gathered using a biometric sensor 2 located within the PIA 1. Biometric sensor 2 is a finger image sensor, however it is understood that other types of biometric sensors such as iris scan and others are also used.

For PIAs requiring a fingerprint sensor, the PIA has a biometric fraud detection unit (not shown) that will assure that any biometric input gathered from the biometric sensor is from a real physical person, instead of a copy or replica. Preferably for the finger image sensor, this is a blood flow detector.

For systems employing a PIN, PIN input is preferably gathered using a keypad or PIN pad 6 that is also located securely inside the PIA.

Communication security is provided by encryption using unique secret keys known only to that specific PIA and the DPC, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between PIA and DPC. Both DES and public key encryption is well known in the industry.

The PIA also has secure memory that can store and retrieve the unique secret encryption keys used to enable secure communications with the DPC. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each transaction, without leaving behind the trace of the initial secret key. The implications of this are that even successful capture and dissection of a PIA will not reveal messages that have previously been sent, a very important goal when the effective lifetime of the information transmitted is years. DUKPT is fully specified in ANSI X9.24. The DUKPT key table is stored in the secure memory.

Each PIA preferably has a hardware identification code that is registered with the DPC at the time of manufacture. This makes the PIA uniquely identifiable to the DPC in all transmissions from that device. This hardware identification code is stored in write-once memory 10.

PIA physical security is assured by standard mechanisms. Preferably, these comprise tamper-detect circuitry, an enclosure that cannot be easily opened without visibly injuring the enclosure, erasable memory for critical secrets such as encryption keys, write-once memory for hardware identification, tight integration of all components, and "potting" of exposed circuitry.

Information such as the amount of a transaction, the identity of a payee, the list of checking accounts for a payor to select from, or other transaction-related information is displayed using an integrated LCD screen 14. A checking account is defined as any type of a financial account from which an ACH transaction can be originated, such as a checking account, a money market account with check-writing privileges, and the like. It is preferable that the LCD screen be connected securely to the other components in the PIA to maintain security. Approval or cancellation of a electronic check transaction is done using the PIA keypad.

The magnetic ink character reader (MICR) 20 is used to read the account number that is encoded in magnetic ink on the paper check. This is used during initial registration to link a payor's checking account number to the biometric identity.

Optionally, the PIA also validates public key digital certificates. In one embodiment, public keys of a particular certifying authority are initially stored in the PIA at the time of construction. This provides the mechanism to verify a payee's digital certificates that are signed by the certifying authority.

The PIA also optionally displays a list of payor checking or payee financial accounts on the LCD screen and provides for selection of accounts using the keypad. Specific logos provided by each bank are preferably displayed in place of the account number, so that the payor can select which checking account the electronic check will come from using the keypad.

Although a preferred embodiment is described above, there are many different variations on specific PIA implementations. Fundamentally any device that is secure, can identify a person or entity with a high degree of certainty, and can connect to the DPC via some form of communication line can serve as a PIA.

In some embodiments, specifically the home use and public use instances, the PIA hardware identification code is not used to identify either the payor or the payee.

Communication Lines

Communications between the PIA and the DPC occur via many different communication methods. Most depend on the particular communication networks already deployed by the organization or retailer that deploys the transaction authorization system.

Figure 2:
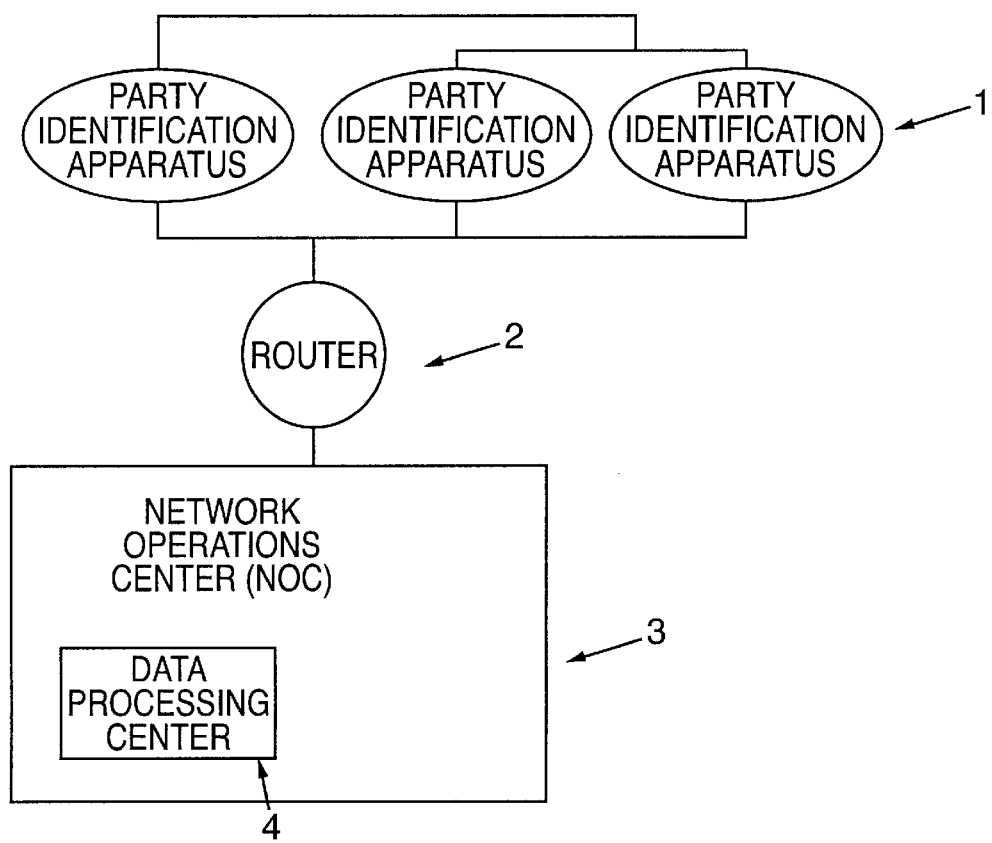
FIG. 2 shows the connection between the PIAs to a local router and a network operations center.

In an embodiment shown in FIG. 2, the PIAs 1 are connected via ethernet to a local router 2, which is itself connected to a network operations center (NOC) 3 via frame relay lines. At least one DPC 4 is located at the NOC. Messages are sent from PIA to the DPC using TCP/IP over this network.

Figure 3:
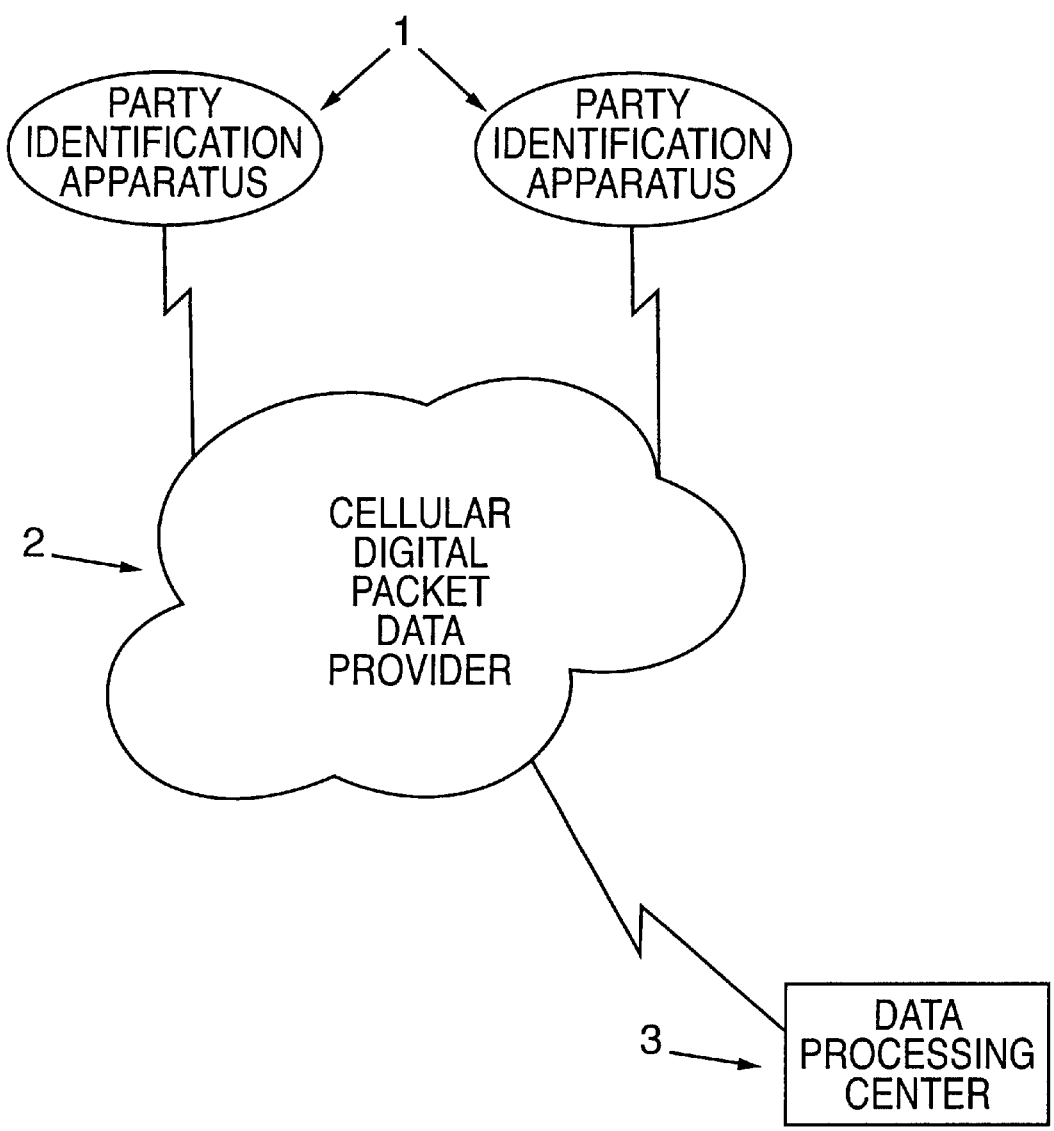
FIG. 3 shows an embodiment where the PIAs are connected to the DPC using a cellular digital packet data.

In another embodiment shown in FIG. 3, the PIAs 1 are connected via a cellular digital packet data (CDPD) modem to a CDPD provider 2, who provides TCP/IP connectivity from the PIA to an intranet to which at least one DPC 3 is attached.

In yet another embodiment, a PIA is connected via the Internet, as is at least one DPC. TCP/IP is used to transmit messages from PIA to DPC. There are many different ways to connect PIA to DPC that are well understood in the art.

Data Processing Center

Data Processing Centers (DPC) serve to identify the payor and, optionally, the payee in a transaction, retrieve checking and financial account information for identified parties, and perform the execution that will result in settlement of transactions and funds delivery for the electronic check.

Figure 4:
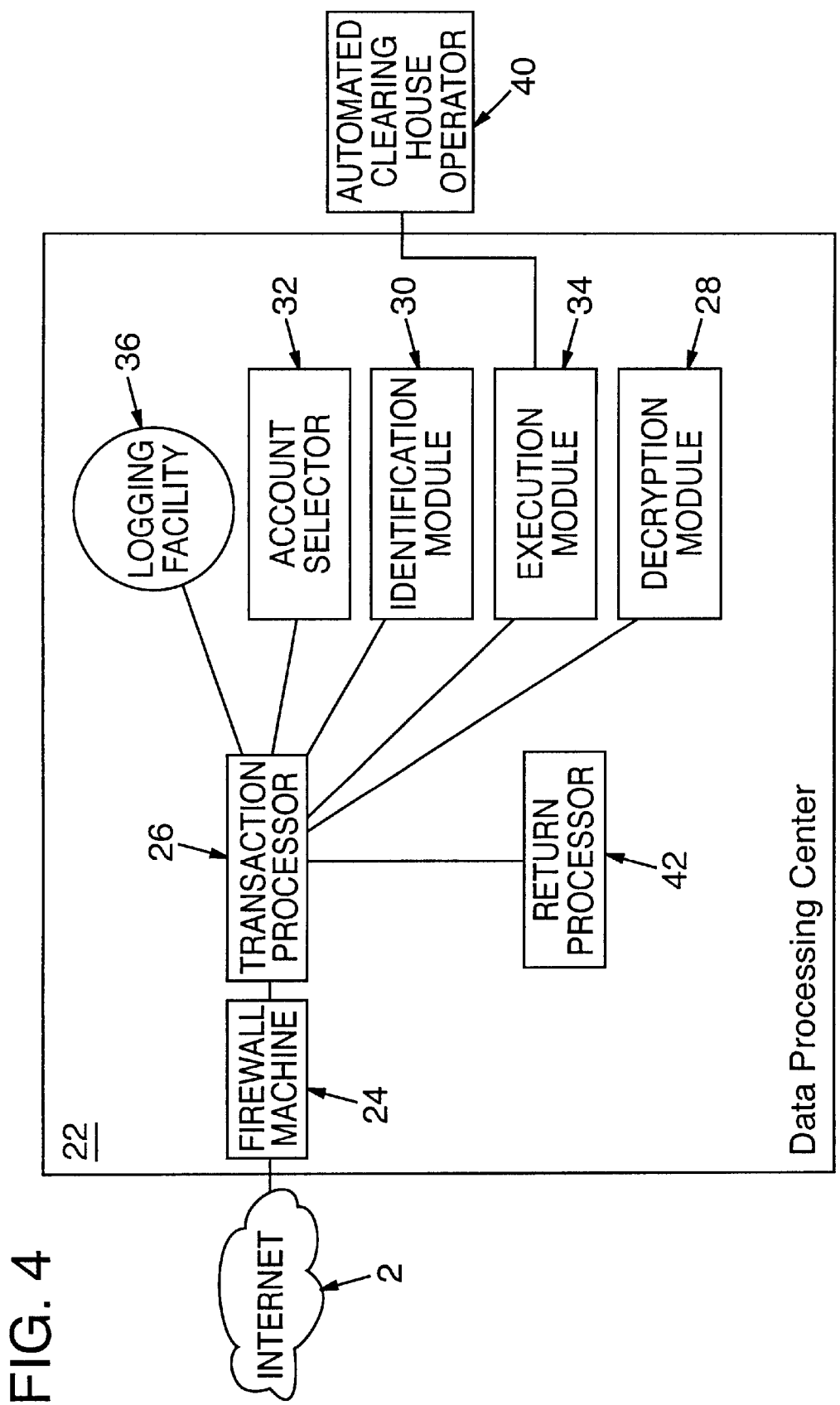
FIG. 4 is a preferred embodiment of the Data Processing Center (DPC) showing the connections between its components.

As seen in FIG. 4, the DPC 22 is connected to the Internet or intranet 2 using a firewall machine 24 that filters out all messages that are not from legitimate PIA devices. Messages are then sent to a transaction processor (TP) 26, which is responsible for overseeing the steps required to process the entire financial transaction.

In a preferred embodiment, the messages are decrypted. For this, the transaction processor uses the decryption module (DM) 28, which utilizes the hardware identification code of the PIA to identify the encryption codes that is required to decrypt the message from the PIA.

Once decrypted, the identity of both parties to the transaction is determined using the identification module (IM), or comparator engine 30. Once identified, the TP 26 determines the financial accounts each party will use using the account selector (AS) 32. This requires a DPC message back to the originating PIA if either the payor or payee have several financial accounts to choose from for completion of the financial transaction.

Once the financial account of each party for the transaction is selected, the financial transaction is executed using the execution module (EM) 34. The EM preferably first verifies that financial accounts of both parties to the transaction are valid and that the electronic check is likely to clear. Thereafter, EM 34, creates an electronic check using an ACH transaction that is eventually sent to the ACH Operator 40. Each transaction (successful or not) is logged in the logging facility (LF) 36.

Electronic checks that are returned for any reason are processed using the return processor (RP) 42, which re-presents returned checks whose accounts were temporarily short of funds, and reports to the payee as uncollectable all of the remaining returned electronic checks.

In a preferred embodiment, more than one DPC provides fault tolerance from either natural or man-made disasters. In this embodiment, each DPC uses backup power generators, redundant hardware, mirrored databases, and other standard fault tolerant equipment known in the industry.

Decryption Module (DM)

In a preferred embodiment, all messages the DPC receives, with the exception of those not constructed by a PIA, contain a PIA hardware identification code, a sequence number, and a Message Authentication Code (MAC). (Message authentication codes, also known as cryptographic checksums, well known in the transaction industry, are used to assure that any changes to the content of the message will be detectable by the entity receiving the transmission.). The DM validates the message's MAC and then checks the sequence number for that particular PIA. If the DM determines that both the MAC and the sequence number are valid, the DM uses the unique secret key for that particular PIA to decrypt the message. For the decryption to function properly, the DM must contain a copy of each PIA's DUKPT key table.

If the decryption operation fails, or if the MAC check fails, the message is considered an invalid message. The TP logs a warning to the LF, terminates processing for the message, and returns an error message to the originating PIA.

Each message TP 26 receives preferably contains a response key stored in the encrypted section of the message. Before the TP replies to a message that includes a response key, it instructs the DM to encrypt the response message with that response key. The DM also generates a MAC for the response and appends it to the message.

Preferably, error messages are not encrypted although the DM does include a MAC for message authentication. Such messages never include confidential information. However, most response messages include a status or response code that can indicate whether the request succeeded or not. For example, when the EM declines a transaction for financial reasons, it does not return an error message, it returns a normal transaction response message with a response code set to "failed".

Identification Module (IM)

Party identification occurs in different ways, depending on the identification information that is provided by the PIA. The identification module has subsystems for each type of information that is provided, and each subsystem is highly optimized to provide rapid identification as outlined below.

In one embodiment, the ID module detects payors or, optionally, payees that re-register with the system by conducting a re-registration check. Given a particular registration biometric sample submitted by a person attempting to register with the system, the ID module determines if that person has ever been registered previously by comparing the registration biometric sample with other biometric samples previously registered. If a match occurs, the registration is rejected.

In a preferred embodiment, identification module 30 comprises subsystems that can identify parties from the following information:

biometric data and PIN biometric data alone digital identification (digital certificates)

PIA hardware identification code

Biometric-PIN Identification Subsystem (BPID)

In a preferred embodiment, the BPID subsystem comprises at least two BPID processors, each of which is capable of identifying parties from their biometric and PIN codes.

Preferably, the database of parties identifiable from biometric-PIN combinations are distributed equally across all BPID processors. Each processor is then responsible for a subset of identifications.

Figure 5:
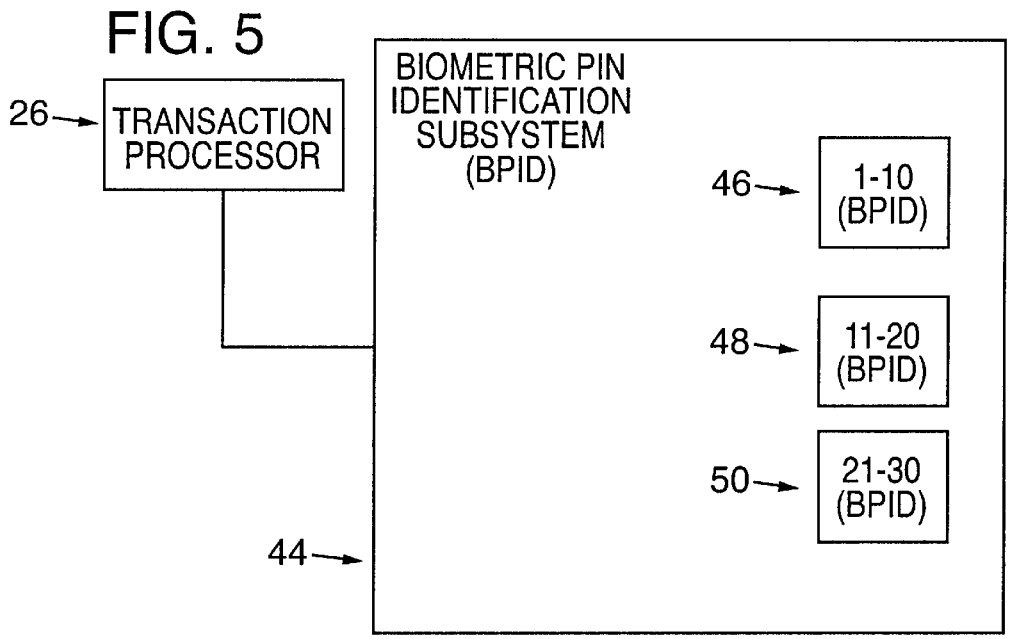
FIG. 5 shows a method by which the transaction processor determines a Biometric-PIN from the Biometric-PIN Identification subsystem is responsible for a given subdivision of the biometric database.

In FIG. 5, TP 26 determines which Biometric-PIN from the BPID subsystem 44 is responsible for a given subdivision of the biometric database. In one embodiment, one BPID 46 is responsible for identifying people with PINs 1-10, another BPID 48 is responsible for identifying PINs 11-20, and a third BPID 50 is responsible for identifying PINs 21-30. For example, all messages from the PIA containing a PIN that equals the number 30 would be routed to BPID 50 for identification of the payor.

Once a BPID processor receives a bid biometric sample and PIN for identification, the processor searches through its database, retrieving all registered biometric samples that match or correspond to that particular bid PIN. Once all corresponding registered biometric samples are retrieved, the processor compares the bid biometric from the message to all retrieved registered biometric samples. If a match is found, the processor transmits the identity of the party back to TP 26. If no match is found, the processor transmits a "party not identified" message back to TP 26.

Biometric Identification Subsystem (BID)

In another embodiment, the BID subsystem comprises at least two BID processors, each of which is capable of identifying parties only from their biometric sample.

In one embodiment, each BID processor contains the entire database of biometrics. To distribute the transactions evenly across processors without undue effort, the TP determines randomly which BID processor will be used for a given financial transaction, and delegates the identification request to that BID processor. That BID processor then performs a search of its biometric sample database in order to find a matching registered biometric sample.

In one embodiment, other information is present that assists the BID processor in searching the database. For finger images, this includes information such as the classification of the image (whirl, arch, etc.), and other information about the finger ridge structure that is useful for selecting out biometrics that are not likely to match (or information on biometrics that are likely to match). Various methods of classification for rapid search of particular biometric databases are known in the art for example with regard to facial imaging and iris recognition.

Biometric comparisons are often more accurate if multiple biometrics are used. In some embodiments, multiple biometrics are used to more rapidly and more accurately identify individuals.

Digital Identification Subsystem

In a preferred embodiment, the digital identification subsystem comprises multiple processors, each of which is capable of identifying a payee from their digital certificates. In this embodiment, digital certificates are used to perform digital identification of the payee. Preferably this includes corporate web site addresses and certifying authorities only. Where possible, people provide biometrics as a means of identification, while computers provide digital certificates.

A digital certificate uniquely identifies a party. The major difficulty is verifying that a particular digital certificate is valid. This requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.

PIA Hardware Identification Subsystem (PHI)

In a preferred embodiment, PIA hardware identification codes are translated into payee identification by the PHI subsystem. This subsystem maintains a list of all PIAs ever manufactured. Preferably, when a particular payee purchases a PIA, that payee's identity is linked to that PIA. Any transactions that originate from that PIA is assumed to be destined for the party that purchased the PIA.

In one embodiment, there are many financial accounts linked to a particular payee, while there is only one financial account linked to transactions issuing from a particular PIA. In another embodiment, the PIA hardware identification code does not serve to identify either the payee or the payor.

This is the case in PIAs purchased for public terminals, Automated Teller Machines, or for home use.

Account Selector Subsystem (AS)

The AS process varies depending on the party being identified. Where the payor has registered only one checking account number, that account number is automatically selected by the AS for debiting of funds.

In the cases where a payor has registered several checking accounts, the AS processor retrieves a list of all designated checking accounts, and transmits them back to the PIA for selection by the payor.

Some corporate entities will have several accounts attached to their identity; one account per point of sale location, one account per region, etc. For these cases, the AS processor invokes a specific selection rule for that particular entity, based on information in an electronic financial transaction message.

In one embodiment, particular PIAs have account selection information associated with them. PIAs assigned to one particular store designate one financial account for deposit of funds, while PIAs assigned to another store designate another financial account for deposit of funds. However, both transactions are associated with the same payee.

In another embodiment, a payor or payee identifying themselves through biometrics has the option to pre-select the account from which the financial transaction will take place, using an account index code. The account index code is optionally an alphanumeric, or a series of numbers and codes that act as an easy-to-remember short-hand for the account number itself. These account index codes are correlated to particular checking accounts during registration.

Execution Module (EM)

In a preferred embodiment, the execution module 34 generates an ACH transaction for each electronic check transaction. Given a transaction amount, the identity of both parties, and a financial account number obtained from the AS for the payee and a checking account number for the payor, an ACH transaction is created and temporarily stored by the EM 34. Preferably, multiple times per day, the EM forwards the collection of stored electronic financial transactions to an ACH Operator (such as the Federal Reserve Bank). The ACH Operator eventually settles the transaction by electronically contacting the respective banks identified by the checking and financial account numbers in the electronic financial transaction, and electronically causing the transfer of funds to occur.

In some instances, there are insufficient funds in an originating checking account to pay for the transaction. In other cases, the checking account has been closed. If the transaction does not settle for these reasons or others, the transaction is "returned", however the return does not necessarily occur immediately. When an ACH transaction is returned for insufficient funds, the ACH transaction is automatically re-presented to the payor's bank. This frees the payees from having to manually process None Sufficient Funds returned check transactions, as is customary with paper checks today.

In one embodiment, the EM reduces fraud by declining to accept an electronic check based upon pre-designated criteria, prior to forwarding the financial authorization to the ACH Operator. The EM does this by examining the payee's checking account history. It optionally considers the amount of the check being written, the recent check-writing pattern and frequency of the originating party, and also any currently outstanding returned checks. Any declines are transmitted back to the originating PIA.

In another embodiment, an assessment is made by a third party "check verification" system, which determines if a given electronic check is likely to be returned as outlined above, and if so, a message is sent from the EM back to the PIA declining the financial transaction.

In yet another embodiment, the payee has the ability to override a decline, and accept the electronic check, absorbing the financial risk.

Logging Facility

In a preferred embodiment, the logging facility (LF) 36 logs all financial transaction attempts to write-once media, so that a record is kept of each transaction and each error that has occurred during the operation of the tokenless authorization system.

Use-Sensitive DPC Configuration

While each DPC has some or all of the above features, in some embodiments the system has use-sensitive data processing capabilities, wherein multiple DPCs exist, some of which store a subset of the total number of registered parties.

This system comprises at least one master DPC, which contains a large subset of all parties registered with the system. The system further comprises at least two local DPCs that are physically apart from each other. Each local DPC contains a subset of the parties contained within the master DPC. Data communications lines allow messages to flow between each local DPC and the master DPC.

In this embodiment, identification request messages are first sent to the local DPC for processing. If a party cannot be identified by the local DPC, the message is forwarded to the master DPC. If the parties are identified properly by the master DPC, the message is processed appropriately. In addition, one or both party's identity information is transmitted from the master DPC to the local DPC, so that the next time parties will be successfully identified by the local DPC.

In another embodiment of a use-sensitive DPC system, the system further comprises a purge engine for deleting a party's identification information from the local DPC databases. In order to store only records for those parties who use the system more than a prescribed frequency and prevent the overload of databases with records from parties who use the system only occasionally, the record of a party is deleted from the local DPC databases if there has been no attempt to identify the party upon expiration of a predetermined time limit.

In order to make communications between the master DPC and the local DPCs secure, the system further comprises encryption and decryption means, wherein communications between the master DPC and local DPC are encrypted.

Registration

Parties that wish to either originate or receive electronic checks must first register with the tokenless authorization system. The identification and financial information registered with the system for a given party depends on the mode used to originate or receive payment. A payor must register at least one biometric or a biometric-PIN. Preferably, corporate entities must register at least one digital certificate, or must register their PIA hardware identification codes. All parties must also register the appropriate financial account information for crediting and debiting by the ACH.

To register, a payor submits a registration biometric sample obtained from their physical person by the PIA's biometric sensor. The PIA determines that the biometric scan is non-fraudulent, and then translates and compresses that biometric scan into a format suitable for rapid transmission to the DPC. The payor then optionally enters a PIN code into the PIA keypad.

Next, the person associates at least one checking account number with the registration biometric sample in the system.

Preferably, this is accomplished by scanning a blank check provided by the person through the MICR reader attached to the PIA.

Preferably, an attendant verifies that the person actually owns the checking account by comparing personal photo id (a driver's license, passport, id card, etc) to the name written on the check. Note that this verification only need happen once, instead of on a per-transaction basis as is common today.

Once the registration data and payor's identity is verified by the attendant, the PIA transmits the registration data to the DPC. The DPC then inserts the biometric (or biometric-PIN) into the appropriate identification database, updates the account selector, and enables the person to originate electronic checks.

In one embodiment, the DPC validates the checking account data submitted during registration. This involves making certain that the checking account being registered is a valid account, and that there are currently no outstanding returned checks listed with that account number. Preferably, an entity may either register at least one digital certificate, or use at least one PIA hardware identification code to identify itself to the DPC. Digital certificates are available from certifying authorities, and they provide the assurance that the entity with the certificate is the authentic owner of that identity. These certificates contain readable text and other information that describes the entity. This can include a corporate logo, the address, as well as the company name.

This digital certificate is then linked to at least one financial account. This financial account is used to deposit all electronic checks written by the payor to the payee when the digital certificate is used to identify the receiving party.

In an embodiment, the financial account of the entity is included in the digital certificate. This is not a preferred embodiment, as the disclosure of the financial account is potentially injurious to the entity.

PIA hardware identification codes are unique numbers assigned to PIA devices at the time of manufacture. If a company wishes all transactions issuing from a given PIA to flow to a particular corporate account, the company registers any such PIAs with the DPC, which updates the PIA device records to reflect the ownership of the PIAs.

Preferably, the security surrounding the registration of entity digital certificates or PIA hardware identification codes to financial account numbers is extremely strong, as this is a potential source for large losses over a short period of time.

Transactions

Transactions optionally occur at a retail point of sale, across the network from a well-known network merchant, or at home or public terminal from one person to another.

Retail Point of Sale Transactions

Figure 6:
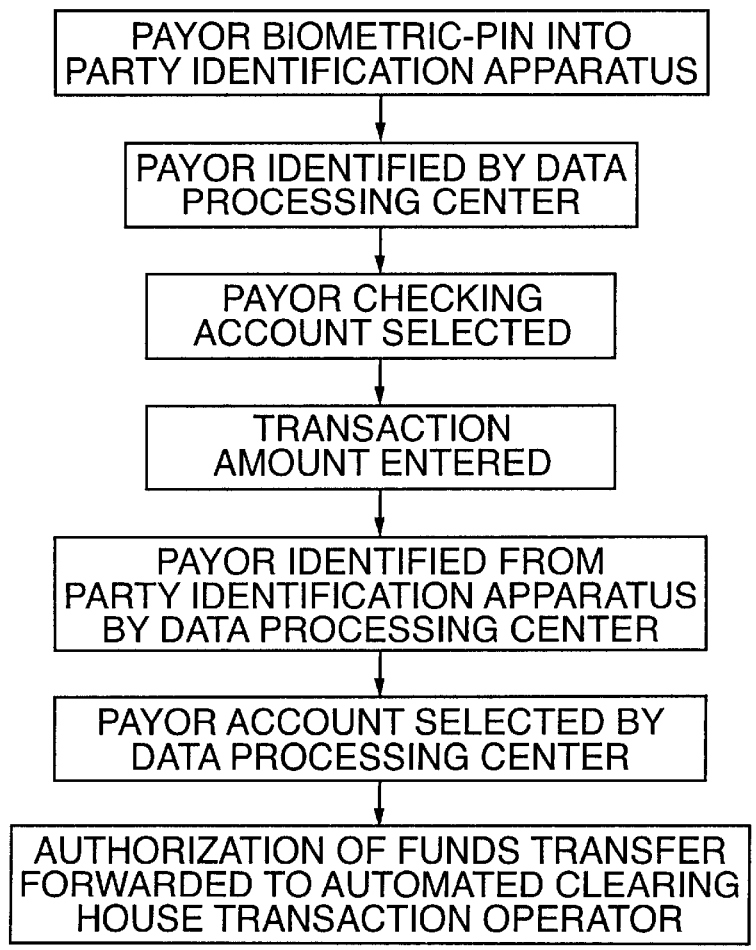
FIG. 6 shows the overall preferred flow chart where a biometric sample and PIN are used by the tokenless system to authorize an ACH transaction.
Figure 7:
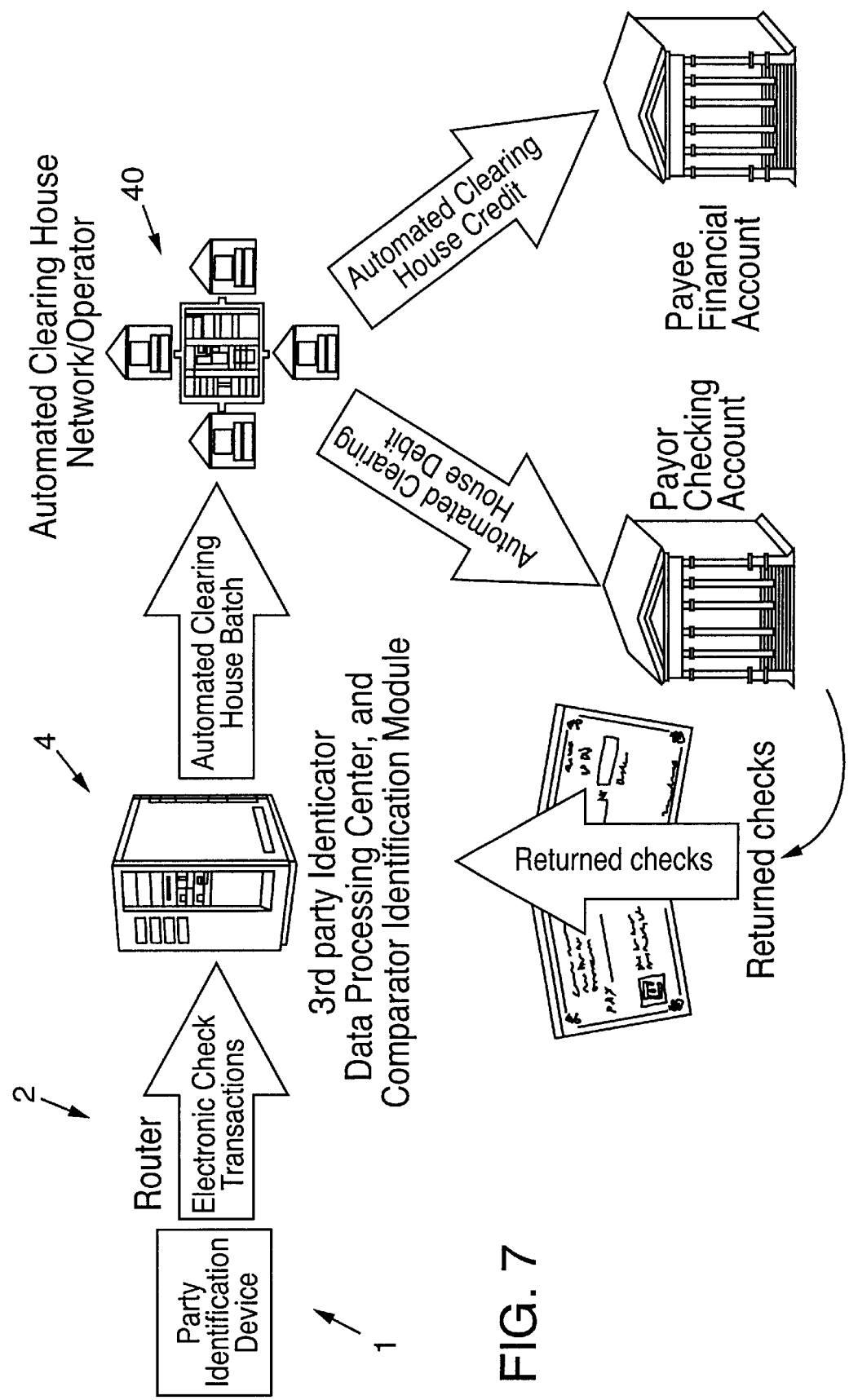
FIG. 7 is a diagram of the shows the overall preferred embodiment of the tokenless system to authorize an ACH transaction.

Retail point of sale transactions as shown in FIGS. 6 and 7 are characterized by identifying the payor using their biometric sample or biometric sample-PIN on a PIA controlled by payee. The payor is thus identified through biometrics, while the payee is optionally identified through the PIA's hardware identification code.

In a preferred embodiment, a party at the point of sale originates an electronic check in the following manner. First, the payor submits a bid biometric sample obtained from their physical person by the PIA's biometric sensor. The PIA determines that the biometric sample is non-fraudulent, and then translates and compresses that biometric sample into a format suitable for rapid transmission to the DPC.

Next, the payor optionally enters a PIN code into the PIA keypad. At this point, the PIA transmits the biometric-PIN to the DPC for identification, optionally along with the PIA hardware identification code. The DPC identifies the payor using the biometric sample, and retrieves the list of checking accounts that the payor has previously registered with the system, and transmits this list back to the PIA. The DPC optionally identifies the payee's financial account using the PIA hardware identification code that was previously registered by the payee.

The PIA displays the list of checking accounts to the payor, who then selects one of the checking accounts from which the funds will be drawn. In the event that only one checking account was registered, that account will be automatically selected by the tokenless authorization system.

The transaction amount is then entered into the PIA, either using an electronic cash register or manually, by the payee. The payor then either approves or cancels the transaction using the PIA's OK and CANCEL buttons. Once the financial transaction is approved, the PIA preferably transmits the financial transaction to the DPC, where the DPC authorizes the transaction and transmits a new ACH transaction to the ACH Operator for the transaction amount.

Execution by the DPC may result in a declined transaction due to lack of funds or other problem condition. If the transaction is declined, the DPC transmits the decline notification back to the PIA, and the payor may either cancel the transaction, or provide another account from which to originate payment.

In another embodiment, instead of the DPC transmitting the list of possible checking accounts back to the PIA for payor selection, the payor instead indicates which account to select by entering an account index code or letter. This code is selected by the payor during account registration and linked to a particular checking account of the payor.

Network Point of Sale Transactions

Network point of sale transactions are characterized by identifying the payor t using the payor's bid biometric sample submitted through the payor's personal PIA, or through a public PIA attached to an ATM or other public terminal. The payee is preferably a registered network merchant, and is identified through a digital certificate. Thus the payor is identified through biometrics, while the payee is optionally identified through the verification of a digital certificate issued by an authorized certifying authority.

In a preferred embodiment, the payor first locates the payee by locating the seller's place of business on the network: the web site, using the network address of the payee. The payor downloads the payee's digital certificate to the PIA that the payor is using. The PIA verifies that the digital certificate provided by the payee is a valid certificate.

The payor then submits a bid biometric sample obtained from their physical person using the PIA's biometric sensor. The PIA determines that the biometric scan is non-fraudulent, and then translates and compresses that biometric scan into a format suitable for rapid transmission to the DPC. The payor then optionally enters a PIN code into the PIA keypad.

The PIA transmits the biometric or biometric-PIN to the DPC for identification, along with the payee's digital certificate. The DPC identifies the payor, and retrieves the list of checking accounts that the payor has previously registered with the system, and transmits this list back to the PIA.

Both parties identify the financial accounts to be involved in the transaction. The payee must do this in an automated manner. In a preferred embodiment, this occurs at the DPC using account selection information included in the transaction by the payee. The payor optionally chooses from among a list of checking accounts, or the payor may have only one account from which payment may be made, in which case the payor's account is selected automatically.

The amount of the transaction is also transmitted to the PIA by the payee. The payor then either approves or cancels the transaction using the PIA's keypad. Once the transaction is approved, the PIA transmits the financial transaction to the DPC, where the DPC authorizes the transaction and transmits a new ACH transaction to the ACH Operator for the transaction amount.

Execution by the DPC may result in a declined transaction due to lack of funds in the account, a closed account, or some other immediately detectable problem condition. If the transaction is declined, the DPC transmits the decline notification back to the PIA, and the payor may either cancel the transaction, or select another account from which to originate payment if another account exists.

In one embodiment, a private code, which is distinct from a personal identification number (PIN) and not used in a payor identification step, is preferably chosen by the user, is transmitted to the PIA from the DPC, and presented to either the payor or payee subsequent to a successful identification using biometrics. This private code identifies the authorization system to the payor or payee users. The private code is selected by the payor or payee during registration with the third party identicator, and is never entered into the PIA during a transaction authorization. Additionally, the PIA and DPC always transmit the private code in an encrypted form. As a result, only the authentic DPC and PIA can provide a person's private code after a successful identification. The private code is displayed to the payor to validate that the authentic electronic third party identicator has processes the transaction.

Also in a preferred embodiment, in a re-presentation step, upon return of the electronic check, the electronic check is automatically re-presented for debiting the checking account of the payor.

The authorization system alternatively further comprises a tokenless authorization system that communicates with one or more external computers during the payor resource determination step and the transaction payment step.

The transaction amount includes data that is necessary for conducting a transaction such as price information, a list of goods and services, a payee name, a date or time, a location, or an invoice number.

The transaction acceptance step optionally further comprises the payor entering a new transaction amount, which is the sum of a cash back amount and the transaction amount, for the financial transaction.

The payor alternatively designates a future date on which the transaction amount is to be deducted from the payor's checking account and credited to the payee's financial account.

Preferably, in a payor re-registration step, the user's registration biometric samples are compared against previously designated biometric samples wherein if a match occurs, the computer system is alerted to the fact that the payor has re-registered with the tokenless authorization system.

Also preferably, in a biometric theft resolution step, where the payor uses a Biometric-PIN identification subsystem, the payor's personal identification number is changed whenever the payor's biometric sample is determined to have been fraudulently duplicated.

Optionally, during the payor registration step, the payor registers at least one payor checking account and assigns an account index code to each payor checking account, and during the acceptance step the user adds the account index code to the financial transaction, wherein the account index code further comprises one or more alphanumeric characters.

In one embodiment, the PIA is actually built-in and/or integrated with a personal computer. These personal computer PIA hardware identification codes are not used to identify either party in a transaction. In another embodiment, the payor can be a representative of a business entity that has permission to access the business entity's accounts to purchase items on the network.

In yet another embodiment, settlement of payment is delayed for an agreed-upon time period, to enable implementation of net-30 payment terms and the like. In one embodiment, a network transaction is deposited into an escrow account at an Internet merchant, instead of into the merchant's actual account as a direct payment for goods received.

From the foregoing, it will be appreciated how the objectives and features of the invention are met. First, the invention provides a financial transaction computer system that eliminates the need for a payor to possess and present any personalized man-made tokens, in order to authorize a transaction.

Second, the invention provides a financial transaction computer system that is capable of verifying a payor's unique personal identity, as opposed to verifying possession of personalized objects and information.

Third, the invention verifies the payor's identity based upon one or more unique characteristics physically personal to the user.

Fourth, the invention provides a cost-effective financial transaction system that is practical, convenient, and easy use.

Fifth, the invention provides a system of secured access to a computer system that is highly resistant to fraudulent transaction authorization attempts by unauthorized users.

Although the invention has been described with respect to a particular tokenless authorization system and method for its use, it will be appreciated that various modifications of the apparatus and method are possible without departing from the invention, which is defined by the claims set forth below.

What is claimed is:

1. A method for tokenless authorization of an electronic check between a payor and a payee using an electronic identicator and at least one payor bid biometric sample, said method comprising the steps of:

(a) a payor registration step, wherein the payor registers with an electronic identicator at least one registration biometric sample, and at least one payor checking account data;

(b) a transaction formation step, wherein an electronic financial transaction is formed between the payor and the payee, comprising at least one payor bid biometric sample, wherein the bid biometric sample is obtained from the payor's person;

(c) at least one transmission step, wherein the payor bid biometric sample is electronically forwarded to the electronic identicator;

(d) a payor identification step, wherein the electronic identicator compares the payor bid biometric sample with at least one registered biometric sample for producing either a successful or failed identification of the payor;

(e) an account retrieval step, wherein the payor's previously registered checking account data is retrieved;

wherein upon successful identification of the payor, a biometric-based authorization of an electronic check is authorized using the payor's previously registered checking account data without the payor presenting any personalized man-made tokens including paper checks and magnetic swipe cards to transfer funds from the payor's checking account to a payee financial account.

2. The method of claim 1 further comprising the inclusion of a transaction amount in the transaction formation step.

3. The method of claim 1 further comprising a display step, in which the payor's previously registered checking account data is electronically displayed to the payor.

4. The method of claim 1 further comprising a forwarding step, in which the payor's previously registered checking account data is electronically forwarded to a financial transaction processor.

5. The method of claim 1 wherein the electronic identicator is operated by a third party.

6. The method of claim 1 wherein the payor registration step further comprises registering a payor personal identification number with the electronic identicator.

7. The method of claim 1 further comprising a payor resource determination step, wherein it is determined if the payor's checking account has sufficient resources to be debited for the transaction amount.

8. The method of claim 1 further comprising a payor account selection step, wherein after the payor has been successfully identified in the payor identification step, the tokenless authorization system presents at least one checking account which was registered by the payor with the tokenless authorization system for selection of one of the checking accounts by the payor for debiting.

9. The method of claim 1 further comprising a transaction payment step, wherein a transaction amount is debited from a payor's checking account.

10. The method of claim 9, wherein the transaction amount is credited to a payee's financial account.

11. The method of claim 1 wherein the registration step further comprises registering a payor private code with the electronic third party identicator, which is distinct from a personal identification number and not used in the payor identification step, wherein the private code is displayed to the payor to validate that the authentic electronic third party identicator has processes the transaction.

12. The method of claim 7 wherein the payor resource determination step further comprises the tokenless authorization system communicating with at least one external computer.

13. The method of claim 9 wherein the transaction payment step further comprises the tokenless authorization system communicating with at least one external computer.

14. The method of claim 2 wherein the transaction amount comprises price information, a list of goods and services, a payee name, a date or time, a location, or an invoice number.

15. The method of claim 1 further comprising a transaction acceptance step in which the payor approves the transaction.

16. The method of claim 15 wherein the transaction acceptance step further comprises the payor entering a new transaction amount, which is the sum of a cash back amount and the transaction amount, for the financial transaction.

17. The method of claim 9 wherein the transaction payment step further comprises the payor designating a future date on which the transaction amount is to be deducted from the payor's checking account and credited to the payee's financial account.

18. The method of claim 1 further comprising a payor re-registration step, wherein the user's registration biometric samples are compared against previously designated biometric samples wherein if a match occurs, the computer system is alerted to the fact that the payor has re-registered with the tokenless authorization system.

19. The method of claim 1 wherein the biometric sample comprises of one of the following: a fingerprint, a facial scan, a retinal image, an iris scan, and a voice print.

20. The method of claim 6 further comprising a biometric theft resolution step, wherein the payor's personal identification number is changed whenever the payor's biometric sample is determined to have been fraudulently duplicated.

21. The method of claim 9 further comprising a re-presentation step, wherein upon return of the electronic check, the electronic check is automatically re-presented for debiting the checking account of the payor.

22. The method of claim 1 wherein during the payor registration step, the payor registers at least one payor checking account and assigns an account index code to each payor checking account, and during an acceptance step the user adds the account index code to the financial transaction, wherein the account index code further comprises one or more alphanumeric characters.

23. A tokenless electronic check authorization device for transferring funds from a payor checking account to a payee financial account, said device comprising:

(a) a computer data processing center further comprising data bases wherein the payor registers a registration biometric sample;

(b) a party identification apparatus having a biometric sensor for input of a biometric sample;

(c) communication lines for transmission of a registration and bid biometric sample obtained by the party identification apparatus from the payor's person to the data processing center;

(d) a comparator engine for comparing a bid biometric sample to at least one registration biometric sample; and (e) an execution module for authorizing transfer of a transaction amount from the payor checking account to a payee financial account upon successful identification of the payor, wherein no man made memory devices such as a credit/debit card, smartcard or a paper check is used by the payor to conduct the financial transaction.

24. The authorization device of claim 23 wherein the payor registration biometric sample is associated with a personal identification number.

25. The authorization device of claim 23 wherein the execution module determines if the payor's checking account has sufficient resources to be debited for the transaction amount.

26. The authorization device of claim 23 further comprising an account selector module, wherein after the payor has been successfully identified, the authorization device presents at least one checking account which was registered by the payor with the authorization device for selection of one of the checking accounts by the payor for debiting.

27. The authorization device of claim 23 wherein the execution module debits the transaction amount from a payor's checking account.

28. The authorization device of claim 27, wherein the execution module credits the transaction amount to the payee's financial account.

29. The authorization device of claim 23 further comprising an authorization device identification means wherein the payor registers a private code with the authorization device, which is distinct from a personal identification number and not used to identify the payor, wherein the private code is displayed to the payor to validate that the authentic authorization device has processed the financial transaction.

30. The authorization device of claim 23 wherein a subset of the payor registration biometric samples are stored in a payor re-registration database, which the comparator engine compares a payor's registration biometric samples to, wherein if a match occurs, the authorization system is alerted to the fact that the payor has re-registered with the tokenless authorization system.

31. The authorization device of claim 23 further comprising a display means for displaying information to the payor.

32. The authorization device of claim 31 wherein the display means is a point-of-sale terminal.

33. The authorization device of claim 31 wherein the display means is a party identification apparatus.

34. The authorization device of claim 23 wherein the execution module is not co-located with the electronic identicator.

35. The authorization device of claim 23 wherein the execution module is operated by a third party and communicates with the electronic identicator via communication lines.

36. The authorization device of claim 23 wherein the execution module consists of communicating with a financial transaction processor.

37. The authorization device of claim 23 wherein the electronic identicator is operated by a third party.

* * * * *